US007395073B2

(12) United States Patent
Gwon et al.

(10) Patent No.: US 7,395,073 B2
(45) Date of Patent: Jul. 1, 2008

(54) METHOD AND APPARATUS FOR LOCATION ESTIMATION USING REGION OF CONFIDENCE FILTERING

(75) Inventors: Youngjune Lee Gwon, Mountain View, CA (US); Ravi Kumar Jain, Palo Alto, CA (US); Toshiro Kawahara, Saratoga, CA (US)

(73) Assignee: NTT DoCoMo Inc., Tokyo (JP)

( * ) Notice: Subject to any disclaimer, the term of this patent is extended or adjusted under 35 U.S.C. 154(b) by 502 days.

(21) Appl. No.: 10/792,450

(22) Filed: Mar. 2, 2004

(65) Prior Publication Data

US 2004/0248589 A1   Dec. 9, 2004

Related U.S. Application Data

(60) Provisional application No. 60/476,401, filed on Jun. 5, 2003.

(51) Int. Cl.
 *H04Q 7/20* (2006.01)
(52) U.S. Cl. ............... 455/456.1; 455/456.2; 455/456.4
(58) Field of Classification Search ............. 455/456.1, 455/456.2, 456.3; 342/463, 464, 357.12, 342/357.06, 462; 701/213
 See application file for complete search history.

(56) References Cited

U.S. PATENT DOCUMENTS

| | | | | |
|---|---|---|---|---|
| 6,275,186 | B1* | 8/2001 | Kong | 342/363 |
| 6,477,380 | B1* | 11/2002 | Uehara et al. | 455/456.1 |
| 6,529,165 | B1* | 3/2003 | Duffett-Smith et al. | 342/463 |
| 7,050,787 | B2* | 5/2006 | Caci | 455/404.2 |
| 2003/0054813 | A1* | 3/2003 | Riley et al. | 455/424 |
| 2003/0222820 | A1* | 12/2003 | Karr et al. | 342/457 |

OTHER PUBLICATIONS

Bahl, P., and Padmannabhan, V., N., "RADAR: An In-building RF-based User Location and Tracking System," Proc. of IEEE Infocom 2000, Mar. 2000.
Pandya, D., Jain, R., and Lupu, E., "Indoor Location Using Multiple Wireless Technologies," Proc. of PIMRC 2003, Beijing, Sep. 2003.
Gwon, Y., Jain, R., and Kawahara, T., "Robust Indoor Location Estimation of Stationary and Mobile Users," Proc. of Infocom 2004, Hong Kong, Mar. 2004.
IEEE 802 Part 11: Wireless LAN Medium Access Control (MAC) and Physical Layer (PHY) specifications. *IEEE Standard* 802.11, 1999.
By Bob O'Hara and Al Petrick, "802.11 Handbook, A Designer's Companion," Standards Information Network, *IEEE Press*, 1999.

(Continued)

*Primary Examiner*—Melur Ramakrishnaiah
(74) *Attorney, Agent, or Firm*—Edward C. Kwok; MacPherson Kwok Chen & Heid LLP

(57) ABSTRACT

A method for location estimation employs filtering in both the radio signal domain and the space domain separately. The method filters raw values of the run-time radio signal measurements to reject distorted inputs. A region of confidence (RoC) is formed according to certain algorithms. Only location estimates falling within the RoC are considered for further processing. The location estimate candidates filtered by the RoC are put in a number of time-indexed bins. Each of the bins contains location estimate candidates obtained at similar times. A shortest route connecting a candidate from each bin is calculated to further improve the accuracy of the location estimation.

40 Claims, 9 Drawing Sheets

OTHER PUBLICATIONS

Matthew S. Gast, "802.11 Wireless Networks—The Definitive Guide," O'Reilly, Apr. 2002.

Arunesh Mishra, Minho Shin, William Arbaugh, "An Empirical Analysis of the IEEE 802.11 MAC Layer Handoff Process," *Submitted to ACM CCR, CS-TR*-4395, *UMIACS-TR*-2002-75.

Joe Kwak (Inter Digital Comm.) "WLAN Handoff Scenarios - Example handoffs with RRM measurements and network assistance," IEEE 802.11 -03/225r0k, Mar. 2003.

Zhun Zhong (Philips), "RRM and Roaming Support," IEEE 802.11 -03/078r0, Jan. 2003.

* cited by examiner

METHOD AND APPARATUS FOR LOCATION ESTIMATION USING REGION OF CONFIDENCE FILTERING

CROSS-REFERENCE TO RELATED APPLICATIONS

This application claims the benefit of Provisional Application No. 60/476,401, filed Jun. 5, 2003. This application incorporates the provisional application by reference.

BACKGROUND OF THE INVENTION

1. Field of the Invention

The present invention relates to location estimation, and more specifically to estimating the location of both stationary and moving objects in a wireless environment.

2. Description of the Related Art

With the development of pervasive computing and location-aware systems and services, there has been an increased interest in location estimation techniques for both outdoor and indoor object positioning. Because of the poor indoor coverage of the Global Positioning System (GPS), there is a greater interest in indoor location estimation.

One conventional approach to indoor location estimation deploys a dedicated sensor network using, for example, infrared or ultrasound technologies. But this approach has cost and maintenance problems.

Another conventional approach is radio frequency (RF) based static scene analysis. With the existing wireless LAN infrastructure, the RF-based static scene analysis system collects radio signal information from wireless LAN beacons, creates a static location information database that stores the collected radio signal information, and obtains location estimates based on radio wave characteristics.

Static scene analysis collectively refers to location estimation techniques involving measurement, calibration and analysis of a specific metric that can be obtained from sensor reading. Static scene analysis typically consists of an off-line stage, where calibration of the indoor wireless environment is carried out, and an on-line (or runtime) stage, where the calibration is used for location estimation.

Specifically, during the off-line stage, a site survey obtaining RF-characteristics at numerous known locations of a wireless environment takes place first. This typically involves receiving signal strength measurements from multiple access points, such as a received signal strength indicator (RSSI) metric, or a link quality metric. The information collected during the site survey is processed and stored in a location information database. The calibration of the wireless environment is then finished, and the information stored will be compared with inputs acquired during the runtime.

During the on-line (or runtime) stage, a user provides a run-time input that is measured instantly at the location of interest. The user uses the same metric that has been used in the off-line stage. Then a location estimation algorithm, which will be introduced below, is applied to compare the run-time and the off-line measurements and compute the location of the object. In RF-signal measurement, numerous sources of interference and noise, such as fading, blocking, and shadowing, occur both transiently and over significant period of time. These phenomena cause corrupted run-time inputs and introduce location estimate errors.

Three conventional algorithms that are widely used in RF-based static scene analysis, i.e., triangulation, K-nearest neighbor averaging, and smallest M-polygon are described in detail below.

FIG. 1 illustrates the triangulation algorithm for location estimation. The triangulation computes the location estimate by solving systems of quadratic equations. The triangulation forms circles whose centers are the locations of the transmitters, e.g., access points or base stations. In FIG. 1, the locations and RF characteristics of access points 1, 2, and 3 have been obtained at numerous known locations, which are used for off-line calibration, during the off-line stage described above. Distances d1 between the object and the access point 1, d2 between the object and the access point 2, and d3 between the object and the access point 3 are calculated based on radio wave characteristics, e.g., TOA or TDOA. Triangulation forms sets of circles. Each of the reference points, access points 1, 2 or 3, becomes the center of a circle, and the distances between the object and the center, d1, d2 or d3, becomes the radius of that circle.

Triangulation estimates locations based on various intersection areas formed by these circles. If three formed circles meet at a single spot, that spot becomes the location estimate as a result of the triangulation. However, as a practical matter, the three circles rarely will meet at a single spot. More often, if the circles intersect, they will intersect in multiple spots. In FIG. 1, the three circles have six intersection points, P1, P2, P3, P4, P5 and P6. The triangulation algorithm examines areas formed by the intersection points to obtain a location estimate for the object. Specifically, the triangle formed by P2, P4 and P5 has the smallest area among all possible triangles formed by these intersection points, and the centroid X of the triangle (P2, P4, P5) is the best location estimate of the object.

FIG. 2 illustrates the K-nearest neighbor averaging algorithm for location estimate, wherein K=5. Typically, K is larger than 2. Experimental analysis shows that K=3 gives the best performance. Let a triplet $(S_a, S_b, S_c)$ represent a set of run-time signal strength measurements at a location of interest from three base stations a, b, and c. Five triplets which have the least root mean square (RMS) error in signal strength between the run-time and the off-line measurements are found. The root mean square error in signal strength is calculated as follows:

$$\text{rms} = \sqrt{(a-a_i)^2 + (b-b_i)^2 + (c-c_i)^2} \qquad (1)$$

wherein $(S_a, S_b, S_c)$ represents off-line signal strength measurements at the location of interest.

In particular, these five triplets are: signal strength triplet (a1, b1, c1) at position L1 (x1, y1) from base stations a, b and c; signal strength triplet (a2, b2, c2) at position L2 (x2, y2) from base stations a, b and c; ... and signal strength triplet (a5, b5, c5) at position L5 (x5, y5) from base stations a, b and c. L1, ..., L5 are determined by using the location information database. The location information database for RF-based static scene analysis typically contains entries used to map RF signal metrics to positions (i.e., transfer from signal domain to space domain). The positions of these five locations are averaged to yield the location estimate of the object as follows:

$$L = (L1 + L2 + L3 + L4 + L5)/5 \qquad (2)$$

FIG. 3 illustrates the smallest M-polygon algorithm for location estimate, wherein M=3. M is the number of access points, or base stations, used for the system. M=3 gives reasonably good performance for the algorithm. Three base stations A, B, and C provides separate candidate locations A1, A2, B1, B2, C1 and C2 that match best with the off-line measurements. The algorithm then searches for the polygon that has the smallest perimeter formed by candidate locations contributed by each reference base station, wherein one and only one candidate from each base station must constitute a vertex of the polygon. In FIG. 3, candidate locations A1, B2 and C2 form the smallest perimeter polygon, in this case, a triangle. The final location estimate of the object is the centroid X of the polygon:

$$x=(A1+B2+C2)/3 \tag{3}$$

The conventional static scene analysis maps from the radio signal domain to the space domain. The final estimate is typically within a coordinate system. A main drawback of the static scene analysis is that it cannot effectively cope with the impact of errors in the radio signal domain. Due to interference and noise, objects at different locations might be represented similarly in the radio signal domain, a phenomenon called aliasing. The conventional methods can not detect aliasing, and may provide these different locations with similar location estimates.

A selective fusion location estimation (SELFLOC) algorithm selectively combines or fuses multiple location information sources to yield a combined estimate in a theoretically optimal manner. The SELFLOC algorithm is disclosed in U.S. patent application Ser. No. 10/330,523, filed Dec. 27, 2002, which is incorporated herein by reference.

FIG. 4 illustrates an overview of the SELFLOC algorithm to fuse three information sources 1, 2 and 3. Each input branch is individually weighted by one of the weights 1, 2, and 3. The sum of the weighted input branches provides the SELFLOC estimate.

The branch weights 1, 2 and 3 are calibrated during the off-line stage using error feedback. A minimum mean square error (MMSE) algorithm can be used for SELFLOC weight training and calibration. As shown in FIG. 4, three location estimates available independently are to be fused, and x-coordinates of these estimates are $X_1$, $X_2$ and $X_3$. The weights for these input branches are $w_1$, $w_2$, and $W_3$ respectively. Thus, the SELFLOC estimate X could be written as:

$$X=w_1 \cdot X_1+w_2 \cdot X_2+w_3 \cdot X_3 \tag{4}$$

It would be advantageous to provide a method for more accurate processing of collected signals to estimate locations of stationary and mobile objects with improved accuracy.

SUMMARY OF THE INVENTION

In view of the foregoing, it is an object of the present invention to provide a method of location estimation that employs filtering in both the radio signal domain and the space domain. The method of the present invention filters raw values of the run-time radio signal measurements to reject distorted inputs. The method of the present invention also forms a region of confidence (RoC) using conventional location estimation algorithms. An interested object is bound within the RoC with a high probability. Only location estimates falling within the RoC are considered for further processing toward a final location estimate.

It is a further object of the present invention to track moving users. The location estimation of the present invention depends on a series of instantaneous measurements on radio frequency (RF) channels. Since RF characteristics of a moving object change, tracking locations of moving objects continuously and reliably is important to the accuracy of location estimation. The present invention improves the overall estimation accuracy by minimizing the effects of transient errors and regenerating the RoC.

BRIEF DESCRIPTION OF THE DRAWINGS

The present invention is described herein with reference to the accompanying drawings, similar reference numbers being used to indicate functionally similar elements.

DETAILED DESCRIPTION OF EMBODIMENTS

The present invention provides a method and apparatus for location estimation that can be used with a variety of RF technologies and location estimation algorithms. With the development of telecommunication, user terminals that combine cellular communication technology and one or more types of wireless LAN technologies, and/or GPS technology, and/or Bluetooth technology are becoming available. The present application takes advantages of the heterogeneity and diversity of the wireless access technologies, and obtains more accurate and robust location estimation for mobile objects by aggregating location estimates from multiple systems and sources. At the same time, the present invention can be used with location estimation using a single technology.

Figure 1:
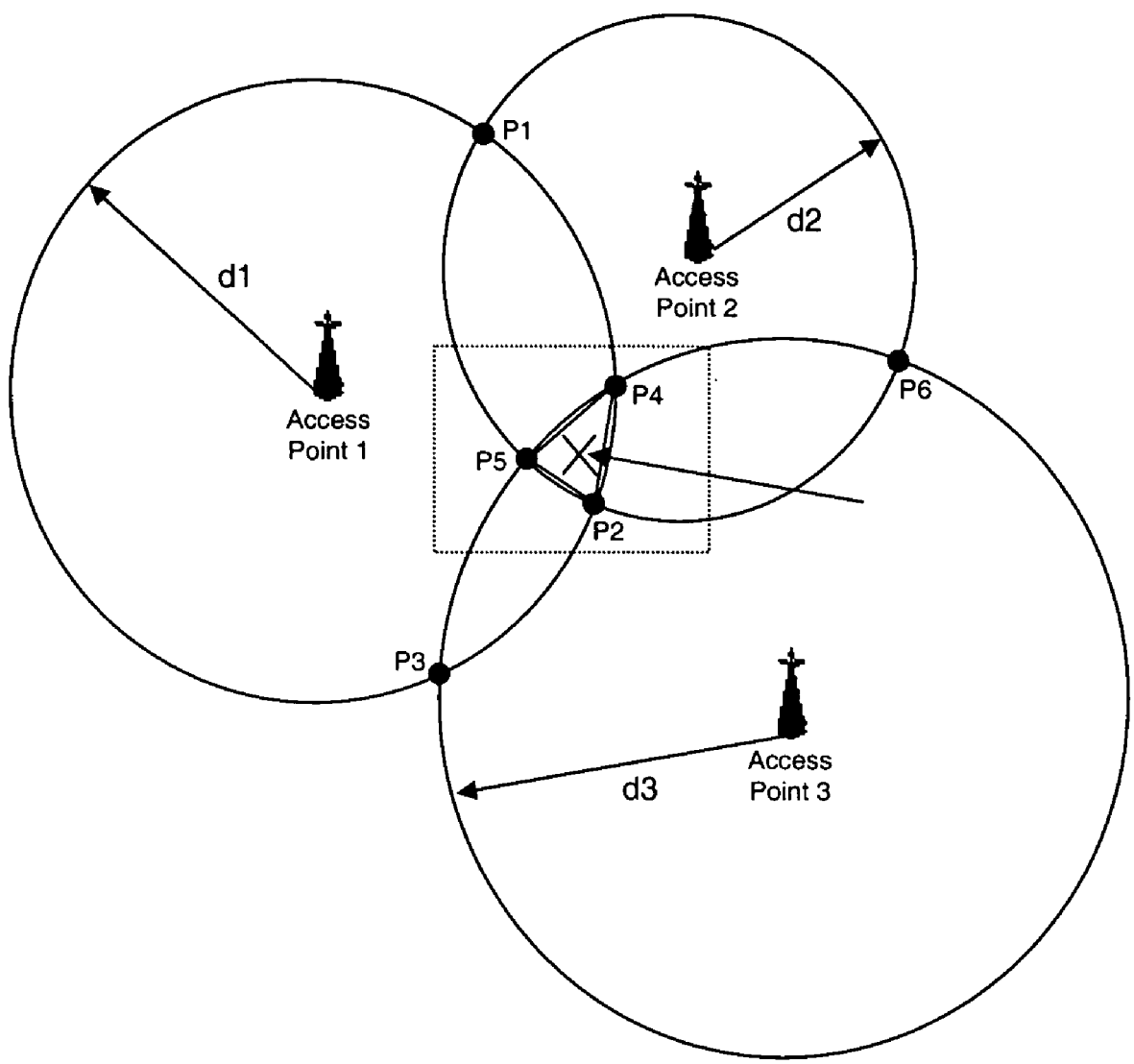
FIG. 1 illustrates the conventional triangulation algorithm for location estimation.
Figure 2:
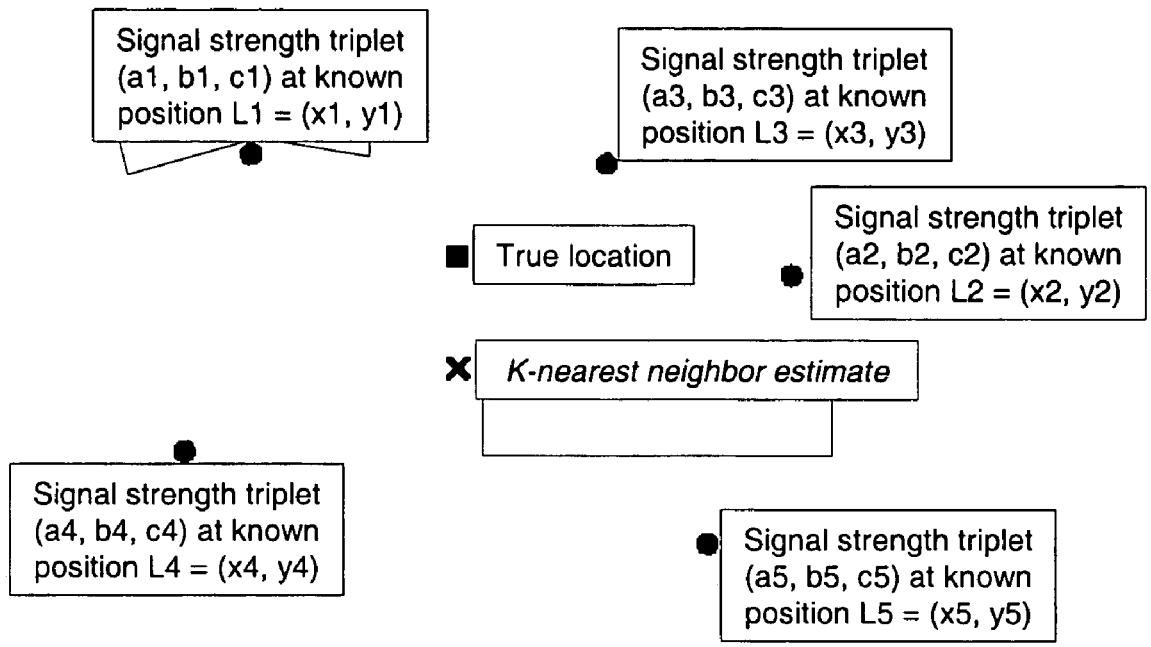
FIG. 2 illustrates the conventional K-nearest neighbor averaging algorithm for location estimation.
Figure 3:
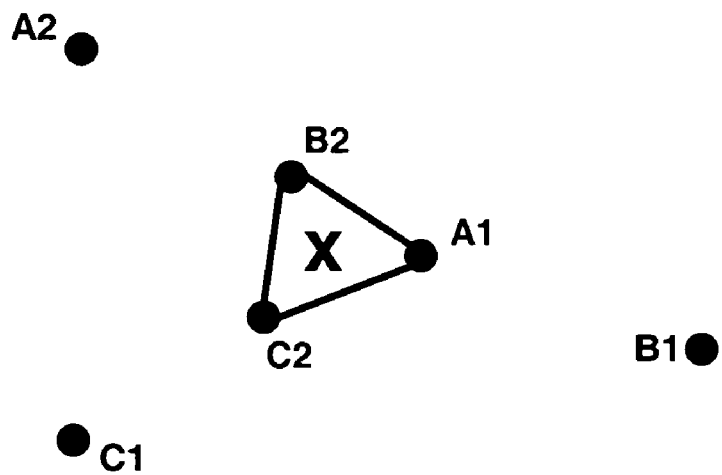
FIG. 3 illustrates the conventional smallest M-polygon algorithm for location estimation.
Figure 4:
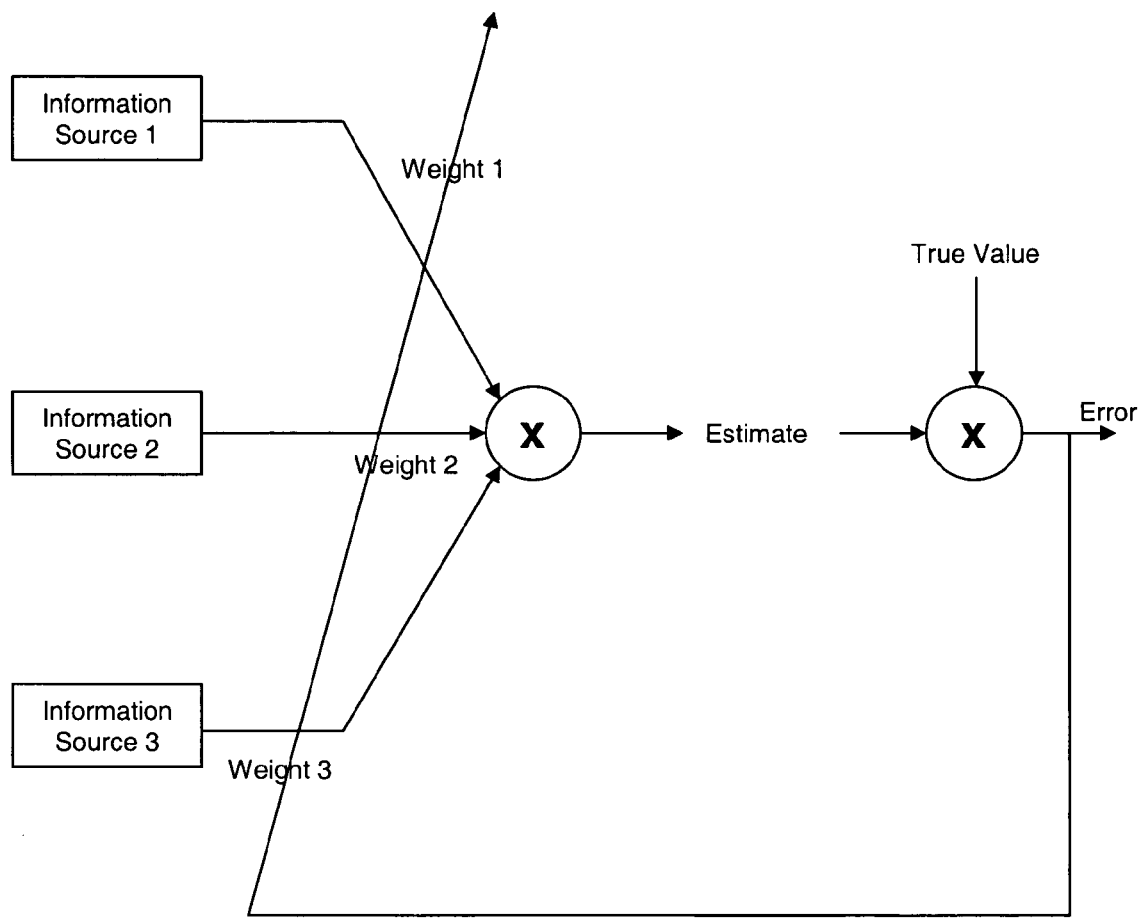
FIG. 4 illustrates an overview of the SELFLOC algorithm.
Figure 5:
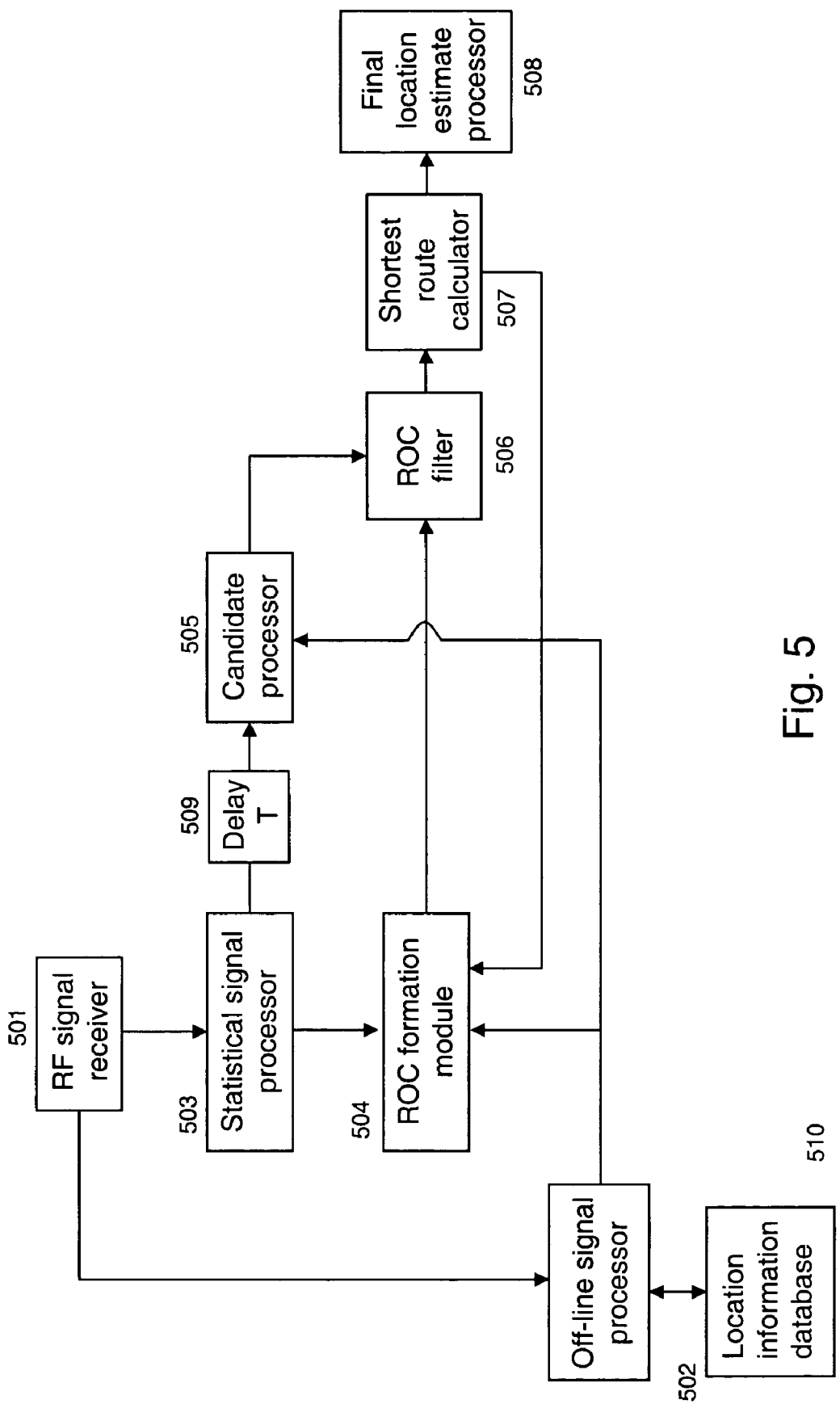
FIG. 5 shows a block diagram of an apparatus for location estimation according to one embodiment of the present invention.

FIG. 5 shows a block diagram of an apparatus for location estimation according to one embodiment of the present invention. In FIG. 5, RF signal receiver 501 receives RF signals from stationary and mobile objects in a wireless environment. An off-line signal processor 502 receives off-line measurements from the RF signal receiver 501, and carries out a site survey. As described above, the off-line signal processor 502 obtains RF-characteristics at numerous known locations of the wireless environment. The information collected during the site survey is processed and stored in a location information database 510. The information stored is compared with run-time inputs later.

A statistical signal processor 503 receives run-time RF signals from the RF signal receiver 501, and filters out distorted signals that might have occurred transiently. In one embodiment, high and low threshold values are set for filtering. The high threshold filters out the received signals above the value of the high threshold, and the low threshold removes the signals below the value of the low threshold. Thus, the distorted signals are excluded in computing location estimation. The threshold values can be set as some percentage of the maximum and minimum measurement values. For example, if the cut-off percentage is 20%, the largest 10% and the smallest 10% of the entire run-time measurements are discarded by the statistical signal processor 503.

A RoC formation module 504 receives signals from the statistical signal processor 503 and the off-line signal processor 502, and forms the RoC. The present invention uses location estimation algorithms, such as triangulation, K-nearest neighbor averaging, and smallest M-polygon, to determine the center of the RoC. It should be understood that other location estimation algorithms could be used as well.

Figure 6A:
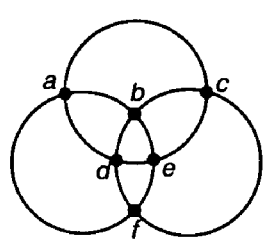
FIGS. 6a-6h illustrate patterns of circles in triangulation according to embodiments of the present invention.
Figure 6B:
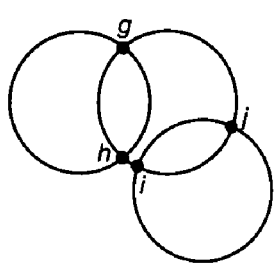
Figure 6C:
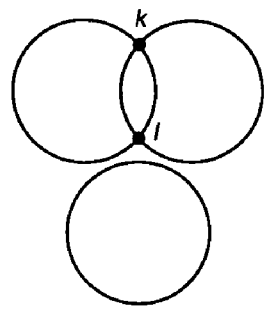

FIGS. 6a-6h illustrate patterns of circles in triangulation, wherein FIGS. 6a-6c show more common three-circle patterns for triangulation manifested experimentally, and FIGS. 6d-6h depict less common three-circle patterns for triangulation.

Three access points are shown in each of these patterns. However, it should be understood that more or fewer access points could be used, with greater or lesser accuracy. The three access points could be selected randomly, or could be the three access points with the highest signal strength, or could be the three access points that are closest together. As discussed above, a circle is formed around each of these three access points. The center of the circle is the location of a respective access point, and radius of the circle is the distance between the access point and the object of interest. In the following discussion, the circles will be referred to by numbers, increasing clockwise.

As shown in FIGS. 7a-7h, the triangulation-based RoC has a shape that is either a circle or a fraction of a circle. The estimate from the triangulation algorithm, i.e., the centroid X of the smallest triangle, becomes the center of the RoC. It should be understood that the RoC could be formed by other methods.

Figure 7A:
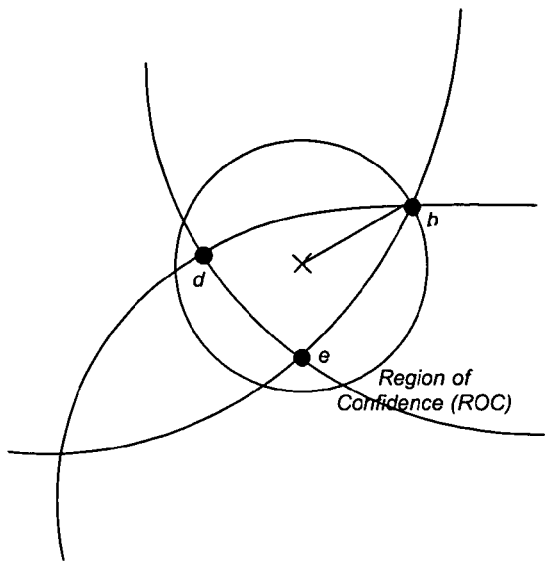
FIGS. 7a-7h illustrate formation of RoC for patterns shown in FIGS. 6a-6h according to embodiments of the present invention.

As discussed above, the triangulation algorithm searches for the smallest area triangle among all possible combinations of triangles that can be formed using solutions of systems of equations, i.e., the intersection points of the circles. For the pattern shown in FIG. 6a, the three circles intersect at points a, b, c, d, e and f, and the equations have six distinct real solutions. Triangle (b, d, e) yields the smallest area, and the centroid X of the triangle is the location estimate of the triangulation algorithm. As shown in FIG. 7a, the centroid X is determined as the center of the RoC. The distance between centroid X and point b is longest among the distances between centroid X and one of the vertices of the triangle (b, d, e) and becomes the radius of the RoC.

Figure 7B:
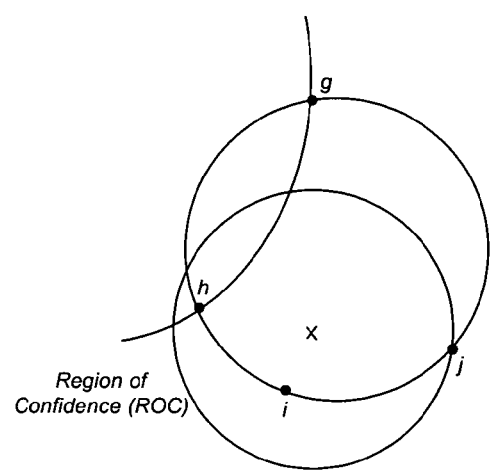

In the pattern shown in FIG. 6b, circles 1 and 2 intersect at points g and h, and circles 2 and 3 intersect at points i and j. Therefore, the equations have four real solutions, g, h, i and j, and two imaginary solutions. Triangle (h, i, j) has the smallest area, and the centroid X of the triangle is the location estimate of the triangulation algorithm. As shown in FIG. 7b, the centroid X is determined as the center of the RoC. The distance between centroid X and point j is longest among the distances between centroid X and one of the vertices of the triangle (h, i, j) and becomes the radius of the RoC.

Figure 7C:
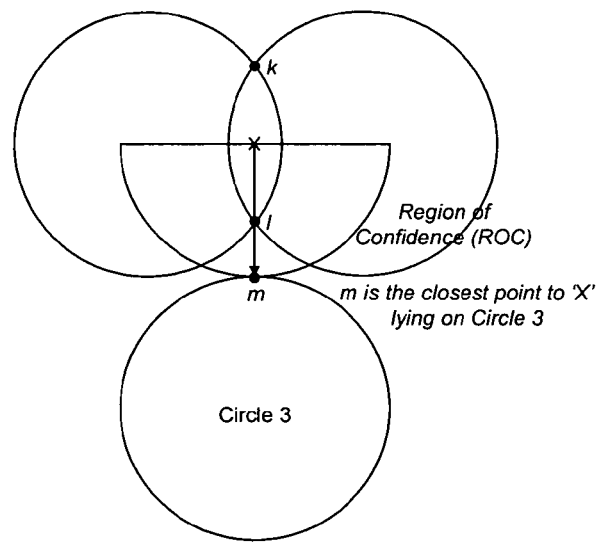

As shown in FIG. 6c, circles 1 and 2 intersect at point k and l, and circle 3 is not tangent to, nor does it intersect with circles 1 and 2. Therefore, the equations have two real solutions, k, and l, and four imaginary solutions. The midpoint X of the line joining points k and l is the location estimate of the triangulation algorithm. As shown in FIG. 7c, the midpoint X is determined as the center of the RoC. Because there is no solution obtained by relation to circle 3, the RoC for this pattern is a half circle. The shortest distance between the midpoint X and circle 3 becomes the radius of the RoC.

Figure 6D:
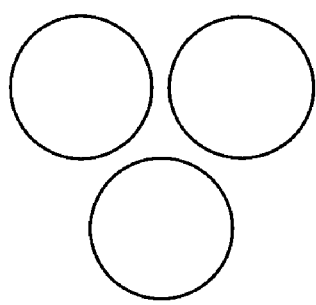
Figure 7D:
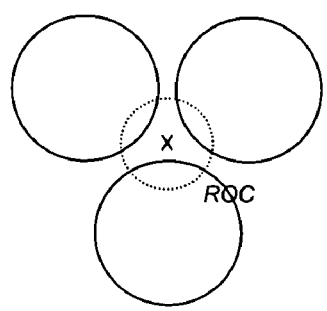

For the pattern in FIG. 6d, circles 1, 2 and 3 do not contact each other at all, and so the equations do not have any real solution. The centers of the three circles are taken as the respective vertices of a triangle and the centroid X of the triangle is the location estimate of the triangulation algorithm. As shown in FIG. 7d, the centroid X is determined as the center of the RoC. The radius of the RoC is half the longest distance between X and location of the access points.

Figure 6E:
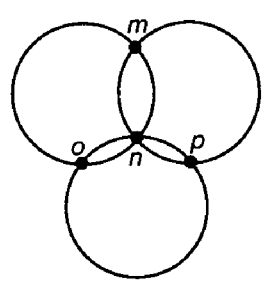
Figure 7E:
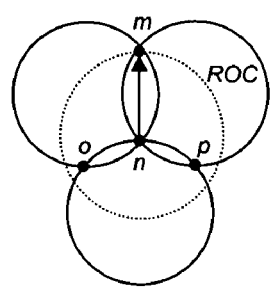

In FIG. 6e, circles 1, 2 and 3 intersect at point n. In addition, circles 1 and 2 intersect at point m, circles 2 and 3 intersect at point p, and circles 1 and 3 intersect at point o. Therefore, the equations have one triple root n and three real solutions. Point n is the location estimate of the triangulation algorithm. As shown in FIG. 7e, point n is determined as the center of the RoC, and the distance between points n and m, the longest among the distances between point n and points m, o and p, becomes the radius of the RoC.

Figure 6F:
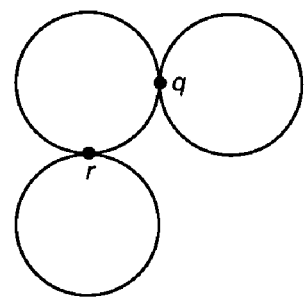
Figure 7F:
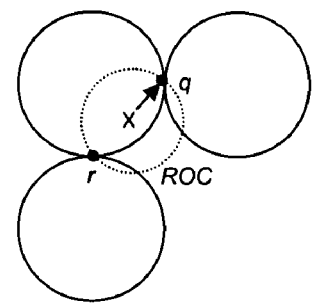

In FIG. 6f, circles 1 and 2 are tangent at point q, and circles 1 and 3 are tangent at point r. Circles 2 and 3 do not contact each other at all. Therefore, the equations have two double roots and two imaginary solutions. The midpoint X of the line joining points q and r is the location estimate of the triangulation algorithm. As shown in FIG. 7f, the midpoint X is determined as the center of the RoC, and the distance between midpoint X and point q or point r becomes the radius of the RoC.

Figure 6G:
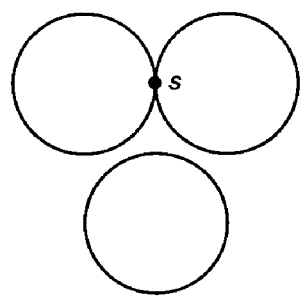
Figure 7G:
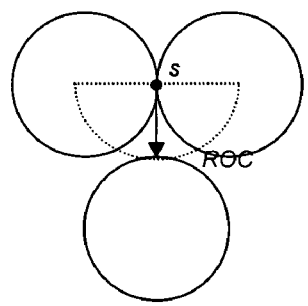

For the pattern in FIG. 6g, circles 1 and 2 are tangent at point s. Neither circle 1 nor circle 2 contacts circle 3. Therefore, the equations have one double root and four imaginary solutions. Point s is the location estimate of the triangulation algorithm. As shown in FIG. 7g, point s is determined as the center of the RoC. As with the calculation for FIG. 6c, the RoC is a semi-circle, because there is no solution by relation to circle 3. The shortest distance between point s and circle 3 becomes the radius of the RoC.

Figure 6H:
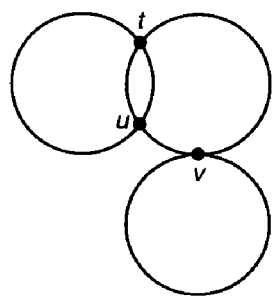
Figure 7H:
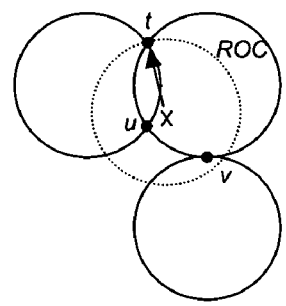

In FIG. 6h, circles 1 and 2 intersect at point t and u, and circles 2 and 3 are tangent at point v. There is no contact between circles 1 and 3. Therefore, the equations have one double root and two real solutions. The centroid X of the triangle (t, u, v) is the location estimate of the triangulation algorithm. As shown in FIG. 7h, the centroid X is determined as the center of the RoC, and the distance between the centroid X and point t, the largest among the distances between the centroid X and one of the vertices of the triangle (t, u, v) becomes the radius of the RoC.

The shape of the RoC using the K-nearest neighbor algorithm is circular. The location estimate produced by the K-nearest neighbor algorithm becomes the center of the RoC, and the longest distance between the location estimate and one of the locations of the K-nearest neighbors becomes the radius of the RoC.

The shape of the RoC using the smallest M-polygon algorithm is also circular. The location estimate produced by the smallest M-polygon algorithm becomes the center of the RoC, and the longest distance between the location estimate and one of the vertices of the smallest perimeter polygon becomes the radius of the RoC.

Turning back to FIG. 5, a candidate processor 505 receives signals from statistical signal processor 503 and off-line signal processor 502, and produces a set of location estimate candidates by location estimation algorithms. The candidate processor 505 uses the same metric that has been used in the off-line stage, and time-stamps the location estimate candidates. Then a location estimation algorithm, such as the triangulation algorithm, the K-nearest neighbor averaging algorithm or the smallest M-polygon algorithm described above, is applied to calculate a set of location estimate candidates. It should be understood that other location estimation algorithms could be used to produce the candidates. It should further be understood that location estimate candidates provided by the candidate processor 505 at a time could be produced by different location estimation algorithms.

A RoC filter 506 receives signals from the RoC formation module 504 and the candidate processor 505, and filters bad location estimate candidates to remove them from consideration. Only location estimate candidates that lie within the RoC will be accepted and further processed toward the final location estimate.

The RoC filtering can be used for coherent aggregation of multiple, and often inconsistent, location reports from different location algorithms and/or different radio wireless technologies. The RoC filtering can also prevent the effect of aliasing. As discussed above, due to noise and interference, two physically distant and thus distinct locations might have similar RF characteristics. Thus, location estimates based on RF characteristics alone may have intolerable errors. The present invention filters both distorted RF signals and bad location estimate candidates before the final location estimation, and improves the accuracy of the location estimation significantly.

Figure 8:
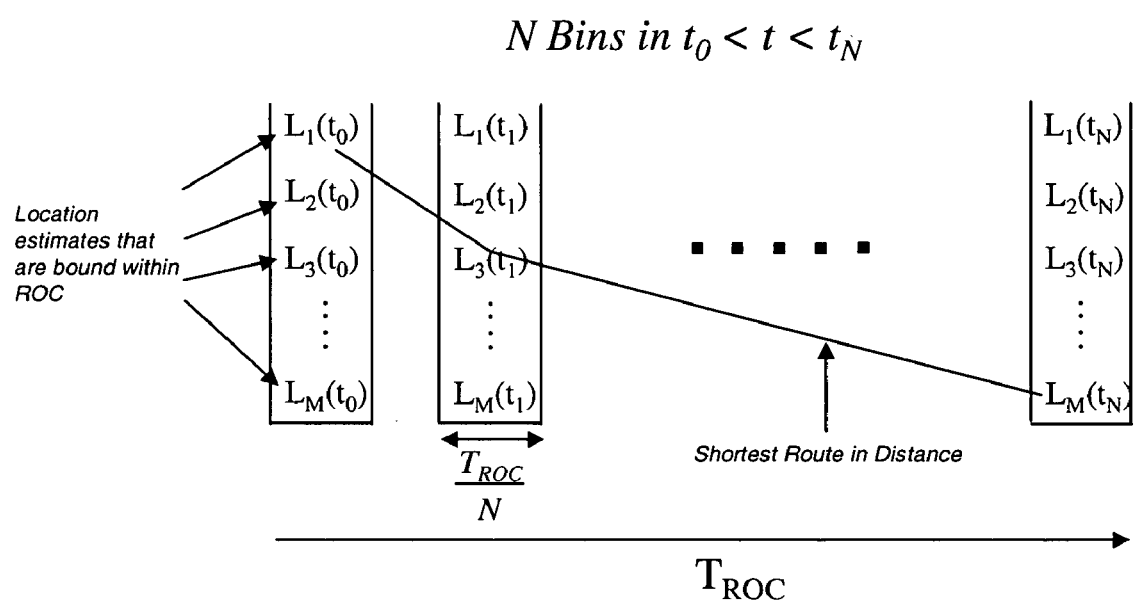
FIG. 8 illustrates the search for the shortest route according to one embodiment of the present invention.

A shortest route (or shortest path) calculator 507 receives signals from the RoC filter 506, and calculates a shortest route connecting all location estimate candidates output by the RoC filter 506. In an embodiment shown in FIG. 8, a number of time-indexed bins are provided to contain RoC filtered location estimate candidates obtained at similar times. A bin at to contains location estimate candidates $L_1(t_0)$, $L_2(t_0)$, $L_3(t_0)$, ... and $L_M(t_0)$ obtained around $t_0$, a bin at $t_1$ contains location estimate candidates $L_1(t_1)$, $L_2(t_1)$, $L_3(t_1)$, ... and $L_M(t_1)$ obtained around $t_1$, and a bin at $t_N$ contains location estimate candidates $L_1(t_N)$, $L_2(t_N)$, $L_3(t_N)$, ... and $L_M(t_N)$ obtained around $t_N$. These time-indexed bins store temporally correlated candidates.

The shortest route that connects one location estimate candidate from each bin is then calculated based on the Euclidean distance between any two temporally consecutive location estimate candidates. If location estimates $L_1(t_0)$ and $L_2(t_1)$ are $(x_1, y_1)$ and $(x_2, y_2)$, then the Euclidean distance between $L_1(t_0)$ and $L_2(t_1)$ is:

$$d12 = \sqrt{(x_1-x_2)^2 + (y_1-y_2)^2} \quad (5)$$

One of the algorithms used to calculate the shortest route is the pair-wise algorithm. In the pair-wise algorithm, only two bins that are consecutive in time are processed at a time, for example, the bin at to and the bin at $t_1$ shown in FIG. 8. Euclidean distances of all combinations of the candidates from the two bins, i.e., $M^2$ pairs of location estimate candidates, are calculated. A shortest distance pair is chosen from these $M^2$ pairs, and the next two bins that are consecutive in time are processed to find another shortest distance pair. In all, N–1 shortest distance pairs are found, after which, a final location estimate processor 508 shown in FIG. 5 calculates the final location estimate by taking average of these N–1 shortest distance pairs.

Another algorithm for calculating the shortest route is a non-pair-wise algorithm. According to this algorithm, N bins are created during the valid period of the RoC, $T_{RoC}$. Each bin has a time width of $T_{RoC}/N$. Each route contains one and only one location estimate candidate from each bin. Thus, there are MN routes. The length of each route is obtained by calculating the Euclidean distance of each neighboring pair of candidates on the route and adding all the Euclidean distances together. Finally, the final location estimate processor 508 calculates the final estimate by taking average of the N location estimate candidates on the shortest route among the $M^N$ routes.

It should be understood that other algorithms could be used to calculate the shortest distance.

During a short period of time, an object can only move a limited distance. If an object travels from one point to another whose distance exceeds what is physically feasible, there must be errors. The time segmentation and shortest route of the present invention removes such problematic candidates from the final location estimate processing.

In the location estimate unit shown in FIG. 5, the RoC formation module 504 receives a RoC regeneration signal from the shortest route calculator 507. The RoC is not valid for all time because an object may move. The valid period of RoC is $T_{RoC}$. When v is the velocity of the moving object, and $r_{RoC}$ is the radius of the RoC, the $T_{RoC}$ can be determined, for example, by the following formula:

$$T_{RoC} = \frac{r_{RoC}}{v} \quad (6)$$

Whenever the $T_{RoC}$ expires, the shortest route calculator 507 informs the RoC formation module 504, and a new RoC is generated. In one embodiment, when the total distance of the shortest route exceeds radius of the RoC, it is possible that the object has moved out of the current RoC, and a new RoC is generated. In another embodiment, $T_{RoC}$ is a configurable parameter and the RoC is regenerated periodically whenever the $T_{RoC}$ expires.

In a further embodiment, RoC regeneration is based on prefetched run-time inputs. In this embodiment, a small time delay T 509 is inserted to the input of the candidate processor 505. The run-time measurement values at the input of the candidate processor 505 are delayed by T. Thus, the regeneration of RoC can be started smoothly before accuracy of the location estimate becomes intolerable. The delay 509 is not necessary in other embodiments and may be omitted.

It should be understood that the location estimation unit and method of the present invention can be installed in fixed stations, such as operational elements of a wireless network (e.g., access points, routers, severs, etc.), or in moving objects, such as wireless terminals which operate within a wireless networked environment.

Figure 9:
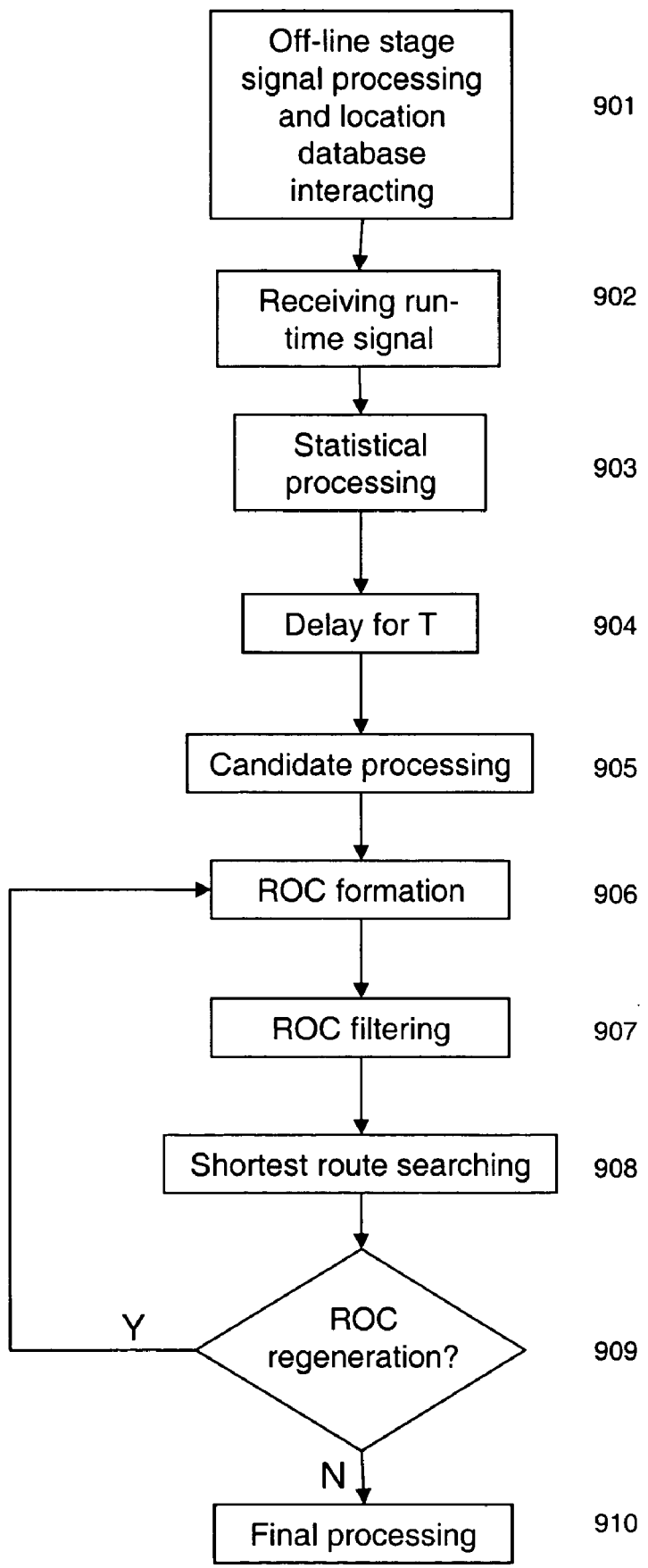
FIG. 9 shows a flowchart of a method for location estimation according to one embodiment of the present invention.

FIG. 9 shows a flowchart of a method for location estimate according to embodiments of the present invention. At step 901, the off-line stage signal processing is carried out and the indoor wireless environment is calibrated by creating and storing the signal metric and associated positions in new entries in the location information database or by updating the existing entries with new values. Run-time signals are received at step 902 and statistically processed to remove distorted RF signals at step 903. In accordance with certain embodiments, the statistically processed run-time RF signals may be provided with a time delay T at step 904. Location estimate candidates are calculated at step 905 and a RoC is formed at step 906. At step 907, location estimate candidates out of the RoC are filtered to improve the accuracy of the location estimation. At step 908, the shortest route connecting all location estimate candidates output by the RoC filter 506 is searched to further reduce errors. If it is time for RoC regeneration, the process goes back to step 906. Otherwise, the process proceeds to step 910 to produce the final location estimates.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method for location estimation in a wireless communication environment, comprising:

at a plurality of known locations, receiving RF signals from a plurality of transmitters in the wireless communication environment to provide a site survey according to a predetermined set of metrics, the site survey characterizing the wireless communication environment by the RF signals received at the known locations;

at a mobile station, receiving RF signals from the transmitters;

using the RF signals received at the mobile station and based in part on the site survey, (a) calculating a number of location estimate candidates for the mobile station by a location estimation algorithm; and (b) forming a region of confidence (RoC) for the location estimate candidates.

2. The method according to claim 1, wherein the RF signals are selected from the group consisting of cellular phone signals, WLAN signals, and Bluetooth signals.

3. The method according to claim 1, further comprising filtering the RF signals to remove distorted signals.

4. The method according to claim 1, wherein the location estimation algorithm for calculating the location estimate candidates is selected from the group consisting of a triangulation algorithm, a K-nearest neighbor averaging algorithm, and a smallest m-polygon algorithm.

5. The method according to claim 1, wherein the RoC is at least a part of a circle.

6. The method according to claim 4, wherein the center of the RoC is a location estimate determined by a location estimation algorithm.

7. The method according to claim 6, wherein the location estimation algorithm for determining the center of the RoC is a triangulation algorithm.

8. The method according to claim 7, wherein a first circle, a second circle and a third circle are used to determine the center of the RoC.

9. The method according to claim 8, wherein, when the three circles intersect at six points, the center of the RoC is a centroid of a smallest triangle formed by the six points.

10. The method according to claim 9, wherein a radius of the RoC is the longest distance between the centroid and one of the vertices of the smallest triangle.

11. The method according to claim 8, wherein when the first and second circles intersect at two points, and the second and third circles intersect at another two points, the center of the RoC is a centroid of the smallest triangle formed by the four points.

12. The method according to claim 11, wherein a radius of the RoC is the longest distance between the centroid and one of the vertices of the smallest triangle.

13. The method according to claim 8, wherein when the first and second circles intersect at two points, but do not intersect with the third circle, the center of the RoC is a midpoint of the line joining the two points.

14. The method according to claim 13, wherein a radius of the RoC is half the distance between the two points.

15. The method according to claim 6, wherein the location estimation algorithm for determining the center of the RoC is the K-nearest neighbor averaging algorithm.

16. The method according to claim 6, wherein the location estimation algorithm for determining the center of the RoC is the smallest M-polygon algorithm.

17. The method according to claim 1, further comprising filtering the location estimate candidates that fall out of the RoC.

18. The method according to claim 1, further comprising segmenting the location estimate candidates by the time it takes to obtain them, and searching for a shortest route connecting one location estimate candidate at each of the times.

19. The method according to claim 18, further comprising searching for a shortest route according to a pair-wise algorithm.

20. The method according to claim 18, further comprising searching for a shortest route according to a non-pair-wise algorithm.

21. The method according to claim 18, further comprising generating a new RoC whenever the shortest route exceeds the radius of the RoC.

22. The method according to claim 1, further comprising generating a new RoC whenever the period of the RoC expires.

23. The method according to claim 1, further comprising generating a new RoC at a certain period of time before the period of the RoC expires.

24. A computer program product containing program code for performing the method according to claim 7.

25. A computer program product containing program code for performing the method according to claim 15.

26. A computer program product containing program code for performing the method according to claim 16.

27. A computer program product containing program code for performing the method according to claim 17.

28. A computer program product containing program code for performing the method according to claim 18.

29. A computer program product containing program code for performing the method according to claim 21.

30. A computer program product containing program code for performing the method according to claim 22.

31. A computer program product containing program code for performing the method according to claim 23.

32. A computer program product containing program code for performing the method according to claim 1.

33. In a wireless network, a location estimation apparatus comprising:

a RF signal receiver, receiving RF signals from transmitters in the wireless network;

an off-line signal processor for calibrating the wireless network based on the RF signals received by the RF signal receiver at known locations and outputting the calibration data;

a candidate processor, calculating a number of location estimate candidates for the RF receiver by a location estimation algorithm, using the RF signals and the calibration data; and a region of confidence (RoC) formation module, forming a RoC for the location estimate candidates using the RF signals and the calibration data.

34. The apparatus according to claim 33, further comprising a statistical signal processor, receiving signals from the RF signal receiver and filtering distorted RF signals.

35. The apparatus according to claim 33, further comprising a RoC filter, receiving signals from the RoC formation module and filtering bad location estimate candidates.

36. The apparatus according to claim 33, further comprising a shortest route calculator for segmenting the location estimate candidates according to the time it takes to obtain them, and searching for a shortest route connecting one location estimate candidate at each of these times.

37. The apparatus according to claim 33, wherein the off-line signal processor creates a location information database and updates it by storing acquired signal metrics at knows portions.

38. A wireless communication device having the apparatus according to claim 33.

39. A handheld terminal having the apparatus according to claim 33.

40. An access point for use in a wireless communication network, wherein the access point comprises the apparatus according to claim 33.

* * * * *